April 20, 1937.   L. BEHR   2,077,544
ELECTRIC CONDENSER
Filed April 6, 1934
FIG. 1
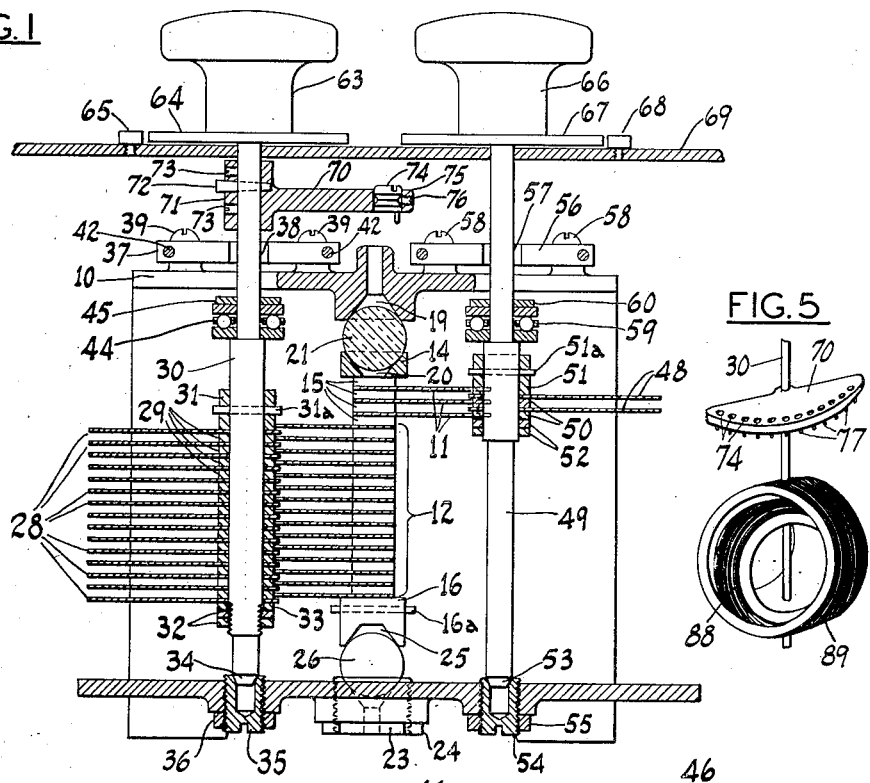
FIG. 5
FIG. 3
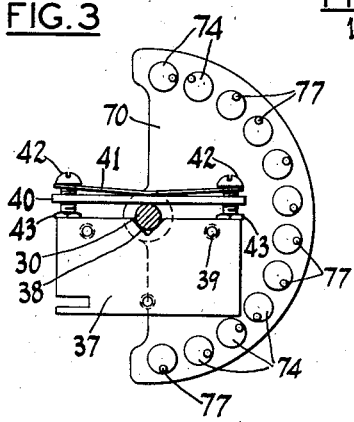
FIG. 2
FIG. 4
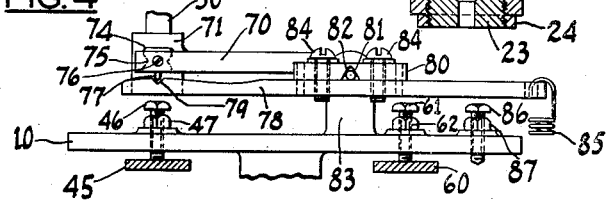
INVENTOR.
Leo Behr
BY
Cornelius L. Ehret
his ATTORNEY Patented Apr. 20, 1937

2,077,544

UNITED STATES PATENT OFFICE 2,077,544

ELECTRIC CONDENSER

Leo Behr, Philadelphia, Pa., assignor to Leeds & Northrup Company, Philadelphia, Pa., a corporation of Pennsylvania Application April 6, 1934, Serial No. 719,252

16 Claims. (Cl. 175—41.5)

My invention relates to electric condensers and more particularly to precision variable electric condensers.

My invention comprises new and improved mechanical and electrical structural features which are particularly useful in connection with variable electric condensers but certain of which are also of general application to precision electrical impedances and analogous devices.

Precision variable electrical impedances, and more particularly precision variable condensers, of the prior art have involved a number of structural features which have not been entirely satisfactory. For example, the mounting of the stationary condenser plates within the supporting frame has comprised a multiplicity of supporting connections between the stationary plate assembly and the frame. To procure accurate and rigid spacing of the stationary plates within the frame has involved extremely accurate and careful machining of the connecting parts. Moreover, it is generally necessary from a practical standpoint to insulate the bank of stationary plates from the frame and the use of a multiplicity of supporting connections of insulating material has provided a substantial conductance which, as is well-known, materially impairs the power factor of the condenser, which desirably is maintained as close to zero as possible.

Moreover, in the precision electric impedances of the prior art, it has not been possible to secure an accurate, uniform scale throughout the range of the movable elements, due to the inaccuracies of design, manufacture and assembly of the component parts. This has necessitated resorting to an individual calibration of the scale of each precision variable impedance device, or the use of an individual calibration curve, expedients which are either costly or extremely inconvenient to the user of the device.

My invention relates to precision variable electric impedances of the type discussed above and is directed to improvement of the several structural features discussed above and to other features described in detail hereinafter.

It is an object of my invention, therefore, to provide a new and improved variable electric impedance which will overcome the above-mentioned disadvantages of the arrangements of the prior art and which will be simple, rugged, and reliable in operation and economical to manufacture.

It is another object of my invention to provide an improved electric condenser in which there is provided a geometrically rigid supporting connection between the stationary bank of plates and its supporting frame, said connection including a minimum number of insulating elements.

It is another object of my invention to provide a new and improved variable electric impedance including an element movable to a plurality of predetermined positions in which the variations in the impedance of the device are equal for movements of the movable element between any successive positions.

It is a further object of my invention to provide, in a variable electric condenser, an improved mounting for the spindle of the movable element which will minimize wear of the parts and which will minimize variations in the characteristic of the device resulting from such wear.

It is a further object of my invention to provide a new and improved click index for a variable electric impedance including a plurality of rigidly spaced elements cooperating with one or more complementary elements and including means for adjusting the spacing of the rigidly spaced elements.

It is a still further object of my invention to provide a new and improved variable electric impedance in which the rotor element of the device is statically balanced.

In accordance with one embodiment of my invention a precision variable electric condenser comprises a rigid supporting frame and a bank of stationary plates supported from the frame by a plurality of spherical insulating members disposed to define a geometrically rigid figure. A movable plate assembly cooperates with the bank of stationary plates and is mounted on a spindle journalled at one end in the frame and at the other end in a bearing member having a V-shaped notch and a spring-biased plate elastically retaining the spindle in the notch. The spindle of the movable plate assembly carries a click plate in which are mounted a plurality of click pins cooperating with a spring-biased detent supported in the frame. The click plate is so proportioned as to have a static moment about the axis of the spindle equal and opposite to that of the movable plates. With such an arrangement the movable plate assembly is restrained in any of a plurality of positions by the click pins and detent. There is also provided means for adjusting the spacing of the click pins to secure uniform variations in the capacity of the condenser for movement of the movable plates between any successive positions, that is, for producing a uniform scale condenser.

If desired, an auxiliary vernier condenser may be mounted in the same frame and cooperate with the main condenser to secure intermediate values of capacitance.

For a better understanding of my invention, together with other and further objects thereof, reference is had to the following description taken in connection with the accompanying drawing and its scope will be pointed out in the appended claims.

Referring now to the drawing, Fig. 1 is a longitudinal sectional view of a precision variable electric condenser embodying my invention;

Fig. 2 is a transverse sectional view of the stationary bank of plates, together with its supporting connections to the frame;

Fig. 3 illustrates in plan view a detail of the click plate mounted on the spindle of the movable plates;

Fig. 4 is a detail of the click index mechanism, while Fig. 5 is a fragmentary view in perspective of the application of the click index of my invention to a variable reactance device.

Referring now more particularly to Figs. 1 and 2, there is illustrated a precision variable electric condenser comprising a rigid supporting frame 10 which may be fabricated in any suitable manner, although I prefer to use an integral casting. Supported from the frame 10 are groups of stationary condenser plates 11 and 12 threaded at opposite ends upon spindles or pillars 13 rigidly spaced at one end by the cross member 14. The banks of plates 11 and 12 are spaced on the pillars 13 by means of conducting metallic washers 15 and, thus spaced, are securely clamped between the cross member 14 and heads 16, fastened at one end of the pillars 13 by means of the pins 16a, the nuts 17 and washers 18.

The banks of plates 11 and 12 may be rectangular or trapezoidal, or any desired form, and extend in opposite directions from the pillars 13 to cooperate with vernier and main banks of movable plates, respectively. In the upper cross member of the frame 10 is provided a conical recess 19 registering with a similar conical recess 20 in the cross piece 14 of the frame of the stationary plates. Interposed in these conical recesses is a spherical insulating member 21 which rigidly spaces from the frame 10 the auxiliary frame comprising the cross piece 14 and the pillars 13. Similarly, there are provided conical recesses 22 in plugs 23 threaded in the lower cross member of the frame 10 and adjustably secured by the lock nuts 24. In the heads 16 of the pillars 13 are provided truncated V-shaped slots 25 registering with the conical slots 22, the slots in the two heads 16 being coaxial. Spherical insulating members 26 are interposed between the recesses 22 and the slots 25. The spherical insulating members 21 and 26 may be of any suitable insulating material, such as glass, Isolantite, fused quartz, or other similar or equivalent material, although I prefer to use fused quartz insulating spheres.

By properly adjusting the plugs 23, the auxiliary frame, including the condenser plates 11—12, takes up a position of equilibrium by the sliding action of the V-shaped slots 25 on the spheres 26, the upper recess 20 being centered opposite the recess 19 by the sphere 21. In this manner, the pressures on the spheres are equalized and the stationary bank of plates is rigidly supported from the frame by these three insulating connecting members defining a geometrically rigid figure or polygon; in this instance, an isosceles triangle. By "geometrically rigid figure" or "polygon," I refer to any disposition of the insulating spheres 21, 26 establishing a geometrically rigid connection in either plane or solid space. An electrical connection may be made to the bank of stationary plates 11—12 in any suitable manner, although I have shown the pillar 13 provided with an extension terminal 27 to serve this purpose.

Cooperating with the bank of stationary plates 12 is the main bank of movable plates 28, spaced by metallic conducting washers 29 and clamped on a spindle 30 between a sleeve 31, secured to the spindle 30 by a pin 31a, and the retaining washer 33 and lock nuts 32. The lower end of the spindle is journalled in a conical bearing 34 provided in a plug 35 threaded into the lower cross piece of the frame 10 and secured by a lock nut 36.

At its upper end the spindle 30 is journalled in a bearing block 37 provided with a machined V-shaped notch or recess 38 and secured to machined bosses on the frame 10 by suitable screws 39. The spindle 30 is elastically retained in the notch 38, as shown in detail in Fig. 3, by a bearing plate 40 elastically pressed against the spindle by a plate or strip spring 41, the spring 41 and plate 40 being provided with holes engaging the retaining screws 42 threaded into the bearing block 37 and secured by lock nuts 43. The spindle 30 is provided also with a thrust ball-bearing 44, the upper plate of which is pressed downwardly by means of a plate or strip spring 45 whose tension is adjusted by screws 46 threaded into the frame 10 (Fig. 2) and secured by lock nuts 47.

Similarly, there may be provided a group or bank of vernier plates 48 provided with spacing washers 50 and clamped on a spindle 49 between a sleeve 51, secured to the spindle 49 by pin 51a, and the lock nuts 52. The spindle 49 is journalled at its lower end in a conical bearing 53 provided in a plug 54 threaded into the frame 10 and secured with a lock nut 55. At its upper end the spindle 49 is journalled in a bearing block 56 provided with a V-shaped notch 57 and secured to the frame 10 by the screws 58 and a spring-biased bearing plate (omitted from the drawing for the sake of clarity) in a manner similar to that of the spindle 30 in the bearing block 37. The spindle 49 is provided with a thrust ball-bearing 59, the upper plate of which is resiliently forced downwardly by the plate or strip spring 60, the tension of which is adjusted by the screws 61 and lock nuts 62 (Fig. 4), as in the thrust-bearing of the spindle 30.

Attached to the upper end of the spindle 30 of the main bank of movable plates 28 is a manual adjusting knob 63 provided with a dial or scale plate 64 and a cooperating pointer or index 65. Similarly, the spindle 49 of the vernier plates 48 is provided at its upper end with a manual adjusting knob 66 and associated scale or dial plate 67 and index 68. The indices 65 and 68 may be mounted on a plate 69 which may form the top of the container unit, in case the condenser is to be used as a separate device, or it may comprise any suitable panel member in case the condenser is to be mounted with other electrical apparatus on a common panel.

Supported on the spindle 30 immediately above the bearing block 37 is a click plate 70 provided with a hub 71 journalled on the spindle 30 and rigidly secured thereto by means of a wedge-shaped key 72 and a pair of set screws 73. The click plate 70 may be of any desired shape, although in Fig. 3 it is illustrated as being semicircular. It is preferably of such weight and so mounted on the spindle 30 as to have a static moment about the spindle 30 equal and opposite to that of the bank of plates 28 in order to balance statically the movable plate assembly. Carried by the click plate are a plurality of small cylindrical members 74 mounted in closely-fitting holes symmetrically spaced about the periphery of the plate 70, as shown clearly in Fig. 3. These cylinders are provided with circumferential grooves 75 engaged by set screws 76 adjustably to retain the members 74 in fixed horizontal positions within their respective holes. Each of the cylindrical members 74 is provided with a small pin projecting from its lower side and eccentric with respect to the axis of the cylinder.

Cooperating with the several click pins 77 is a click arm 78 (Fig. 4) provided with a click detent 79 mounted in the path of movement of the click pins 77 as the plate 70 and the movable condenser plate assembly are rotated with the spindle 30. The arm 78 is provided with a bearing block 80 having a V-shaped notch or recess 81 engaging a pivot pin 82 supported between a pair of opposed lugs or ears 83 upstanding from the frame 10. The bearing block may be secured to the arm 78 in any suitable manner, as by a pair of screws 84. A biasing spring 85 is connected to the outer end of the arm 78 to retain the click detent 79 in elastic engagement with any predetermined one of the several click pins 77. A set screw 86, threaded into frame 10 and provided with a lock nut 87, may form a stop for the outer portion of the arm 78 to limit the upward motion of the click detent 79 and thus facilitate successive engagements with the click pins 77 upon rotation of the click plate 70.

From the foregoing description, it will be apparent that my new and improved precision variable electric condenser comprises the following features briefly enumerated above. The stationary bank of plates 11—12, together with the supporting pillars 13 and cross-bar 14, form a rigid auxiliary frame member which is rigidly supported from the main frame 10 by the three insulating spheres 21, 26, 26 comprising a minimum amount of insulating material, and thus reducing to a minimum the conductance of the device and rigidly fixing the stationary plates relative to the frame with a minimum of deviation from the normal position due to inaccuracies of machining or assembly.

Again, in accordance with the improved mounting of the movable plate assembly, it is restrained by the conical bearing 34 and the V-shaped bearing 38 from movement in any direction except upwardly, as referred to Fig. 1. However, upward movement is prevented by means of the thrust bearing 44 and the plate or strip spring 45, which is preferably so proportioned as to produce a thrust considerably larger than the weight of the movable plate assembly, so that the thrust at the conical bearing 34 is largely independent of the orientation of the condenser unit. As a result, the movable plate assembly is substantially constantly fixed with respect to the stationary bank of plates, except for the desired angular movement of the movable plates, for all positions of the condenser unit. Furthermore, the thrust bearing 44 and spring 45 are effective to take up any wear at the conical bearing 34 or any expansion or contraction of the movable plate assembly occasioned by variations in ambient temperature. It has been found that the bearing block 37, of the type illustrated, with a V-shaped notch and spring-pressed bearing plate 40, is one which may be machined with a maximum of accuracy and which will, at the same time, provide a minimum of lost motion, so that the positioning of the spindle 30 may be effected more accurately than with the usual sleeve bearing.

In the improved electric condenser described above, the usual arrangement of a plurality of rotatable detents and a single cooperating pin is reversed; that is, the click plate is provided with a plurality of click pins cooperating with a single elastically-mounted detent which is effective elastically to restrain the movable plate assembly in any of a plurality of predetermined positions corresponding to the angular positions of the click pins 77. The V-notched bearing 81 of the click arm is similar in type to the V-notched bearings of the main and vernier spindles and provides a bearing which may be machined with a maximum of accuracy, and one which provides a minimum of lost motion.

As stated above, the characteristics of such a variable condenser are usually such that equal angular movements of the movable plate assembly do not produce equal variations in the capacitance of the device. This is due to unavoidable inaccuracies in design, machining and assembly which, although they may be extremely small in magnitude, cannot be tolerated in a precision instrument. In order to avoid the use of the usual non-uniform scale on the index or scale plate 64, or a separate calibration curve, expedients heretofore adopted, the several click pins 77 mounted eccentrically on the cylinders 74 are arranged for angular movement which is effective to adjust the spacing between successive or adjacent click pins. With such an arrangement, the instrument may be included in any suitable standardized bridge network or other circuit, and the positions of the adjusting cylinders 74 adjusted and secured in the adjusted positions corresponding to equal variations or increments in the capacitance of the device for movement of the movable plate assembly between all adjacent positions; that is, between positions in which the click detent 79 engages successive click pins 77.

As is well understood by those skilled in the art, intermediate values of capacitance may be obtained by means of the vernier plates 48 adjusted by the knob 66. With the exception of the mounting of this bank of vernier plates, which is similar to that of the main movable plate assembly, the vernier condenser may be of any of the well-known types heretofore employed. By way of example only, I may state that my invention has been embodied in a condenser unit having a range from 100 to 1200 micro-micro farads in equal steps of 100 micro-micro farads. The minimum value of 100 mmf. corresponds to a position of the vernier somewhat greater than its minimum setting, in this particular instance, of about 50 mmf., which is arbitrarily chosen as the zero of the vernier. In its maximum setting, the vernier has an additional capacitance of 100 mmf., so that, relative to the zero position of the vernier, the capacitance of the main movable plate assembly may be varied from minus 50 mmf. to plus 100 mmf., and the complete range of the unit is from 50 mmf. to 1300 mmf.

The amounts of the eccentricities of the click pins 77 required to secure uniform variations in capacitance between successive positions will, of course, depend upon the closeness with which the condenser approaches a straight-line characteristic which, in turn, will depend mainly upon design, manufacturing, and assembly accuracies.

As shown clearly in Fig. 3, a considerable amount of eccentricity may be provided; in fact, an amount equal to nearly half the distance between adjacent positions, and, since the diameter of eccentricity is available to adjust the position of the click pins, an adjustment equal to nearly the movement of the movable plate assembly between adjacent positions is provided.

While I have illustrated the adjustment of the predetermined positions of the movable assembly by means of a plurality of adjustable and movable click pins and a single non-adjustable stationary click detent, it will be readily apparent to those skilled in the art that either the click pins or the detent may be movable and that there may be employed either a single detent and a plurality of pins, as illustrated, or a plurality of detents and a single pin, or a plurality of detents and pins forming a plurality of mutually and exclusively cooperating pairs. In any case, it is only necessary that there shall be a plurality of pin and detent members each comprising a cooperating pin element and a detent element, and certain of these elements may be common to several members.

In Fig. 5 is shown the application of the click index of my invention to a variable electric impedance device of the reactance type comprising a spheroidal movable coil 88 and cooperating stationary coil 89. The spindle 30 and click index plate 70 are secured to the movable coil 88. The stationary click detent cooperating with the click pins 71 has been omitted for the sake of simplicity. Rotation of the spindle 30 effects an angular movement between the axes of the coils 88 and 89 and varies the reactance of the device, as is well understood by those skilled in the art. The adjustable click pins 71 compensate for any irregularities in the impedance characteristic of the device in the same manner as in the case of the variable condenser.

While I have described what I at present consider the preferred embodiments of my invention, it will be obvious to those skilled in the art that various changes and modifications may be made without departing from the spirit of my invention, and I, therefore, aim in the appended claims to cover all such changes and modifications as fall within the true spirit and scope of my invention.

What I claim is:

1. A variable electric condenser comprising a supporting frame, a bank of stationary plates, a plurality of spherical insulating members supporting said bank of plates from said frame and disposed to define a geometrically rigid figure, a movable plate assembly cooperating with said stationary bank of plates and provided with a spindle journalled at one end in said frame, a bearing for the other end of said spindle comprising a member having a V-shaped notch and a spring-biased plate elastically retaining said spindle in said notch, a plurality of click pin and detent members, the pin and detent elements of each member being relatively movable, a corresponding element of each of said click and detent members being movable with said movable plate assembly, and the elements of each member being mounted for successive engagement upon movement of said movable elements, a corresponding element of each of said members being rigidly spaced, and means for adjusting the spacing of said last-mentioned elements.

2. An electric condenser comprising a supporting frame, a bank of stationary plates, and only three spherical insulating and supporting members for holding said bank of plates fixed with respect to said frame, said supporting members being positioned at the vertices of a triangle, one on one side of said bank of plates and the other two of said members on the opposite side of said bank of plates.

3. An electric condenser comprising a supporting frame provided with top and bottom plates, a bank of stationary plates, an auxiliary frame rigidly interconnecting said bank of plates, one of said frame plates being provided with a single pair of recesses and the other being provided with a single recess and said auxiliary frame being provided with recesses registering with the recesses of said frame plates, and spherical insulating members interposed between registering recesses for maintaining said bank of plates fixed with respect to said supporting frame.

4. An electric condenser comprising a supporting frame provided with top and bottom plates, a bank of stationary plates, an auxiliary frame rigidly interconnecting said bank of plates, one of said frame plates being provided with a single pair of conical recesses and the other being provided with a single conical recess, and said auxiliary frame being provided with a single conical recess registering with the single conical recess of said frame and with a pair of recesses of V-shaped section having their axes in the plane of the centers of the conical recesses of said frame and registering with said pair of conical recesses, and a spherical insulating member interposed between each pair of registering recesses for maintaining said bank of plates fixed with respect to said supporting frame.

5. An electric condenser comprising a supporting frame provided with top and bottom plates, a bank of stationary plates, an auxiliary frame comprising a single pair of pillars interconnecting said bank of plates and a rigid cross-bar interconnecting said pillars, the top frame plate being provided with a single conical recess and the bottom frame plate being provided with a single pair of conical recesses, said cross-bar being provided with a conical recess registering with that in said top frame plate and each of said pillars being provided with a recess of V-shaped section registering with the conical recesses in said bottom plate, and a spherical insulating member interposed between each pair of registering recesses for maintaining said bank of plates fixed with respect to said supporting frame.

6. A click index for a variable electrical device comprising a plurality of click pin and detent members, the pin and detent elements of each member being relatively movable and said elements being mounted for successive engagement upon movement of the movable elements of said members, means for rigidly and approximately equally spacing a corresponding element of each of said click and detent members, and means for adjusting the spacing of said last-mentioned elements only within a range less than the spacing of adjacent elements.

7. A click index for a variable electrical device comprising a click arm provided with a detent and a click plate movable relative to each other, said plate being provided with a plurality of click pins mounted successively to engage said detent upon relative movement between said plate and arm, and means for varying the spacing of said pins in said plate.

8. A click index for a variable electrical device comprising a stationary click arm provided with a detent, a pivoted plate provided with a plurality of click pins mounted for successive engagement with said detent upon rotation of said plate, and means for varying the settings of said click pins in said plate.

9. A click index for a variable electrical device comprising a click arm provided with a detent and click plate movable relative to each other, a plurality of click pins mounted in said plate successively to engage said detent upon relative movement between said plate and arm, each of said pins comprising a cylindrical portion journalled in said plate and a portion projecting eccentrically from said cylindrical portion, and means for securing said pins in said plate in any desired angular relation.

10. A click index for a variable electrical device comprising a pivotally mounted plate, a plurality of click pins mounted in said plate in an arc about its pivotal axis, each of said pins comprising a cylindrical portion journalled in said plate and a portion projecting eccentrically from said cylindrical portion, a groove in the cylindrical portion of each of said pins, means associated with said plate for engaging the grooved portions of said pins to maintain them in any desired angular position, a pivoted click arm provided with a detent mounted successively to engage the projecting portions of said pins upon rotation of said plate, and a spring engaging said click arm to bias it into engagement with said pins.

11. A variable electric condenser comprising a bank of stationary plates, a pivotally mounted bank of movable plates, a click mechanism for restraining said movable plates in any of a plurality of predetermined positions, said mechanism comprising a plate movable with said movable bank of plates, a plurality of click pins mounted in said plate in an arc about its pivotal axis, each of said pins comprising a cylindrical portion journalled in said plate and a portion projecting eccentrically from said cylindrical portion, a cooperating detent member and means for compensating for inequalities in the variations of the capacitance of the condenser upon movement of said movable bank of plates between adjacent positions comprising means for adjustably securing said pins in said plate in any desired angular position.

12. A variable electric condenser comprising a supporting frame, a bank of stationary plates, a geometrically rigid supporting connection between said frame and opposite sides of said bank of plates comprising three insulating members one of which forms a fixed pivotal mounting for said bank with respect to said frame and the remaining two insulating members being adjustable to tilt said bank and to clamp the same into fixed position with equalized pressure between said three insulating members, a bank of plates movable with respect to said stationary bank, means adjustable to predetermine a plurality of positions of said movable bank between which positions the capacitance of said condenser changes by equal amounts, and means associated with said adjustable means for resisting movement of said movable bank from each of said predetermined positions.

13. Means mounting an impedance device in a fixed position between the opposite sides of a frame comprising three separate members extending between said device and said opposite sides, one of said members forming a fixed point of rotation for said device, and means cooperating with said other two members for preventing the rotation of said device except in a plane which includes said members, said other two members being adjustable to clamp said device in fixed position.

14. Means mounting an impedance device in a fixed position between opposite sides of a frame comprising three spaced members extending between said device and said opposite sides, one of said members forming a fixed point of rotation for said device, said remaining two members being located to form in conjunction with said one member a substantially isosceles triangle, and means cooperating with said two members to provide for angular movement of said device along the plane of said triangle, and means for adjusting the positions of said two members to vary the angular position of said device and to clamp said device in a fixed position with equalized pressure between said three members.

15. A variable electric condenser comprising a supporting frame, a bank of stationary plates rigidly supported therein, a movable plate assembly cooperating with said stationary bank of plates, means supporting said assembly for rotation about a fixed axis, a counter-balancing member diametrically opposite said movable plate assembly, said member having a static moment about said axis equal and opposite to that of said movable plate assembly, and a click mechanism one portion of which includes a plurality of click projections, and the other portion of which includes a click detent, one of said portions being supported by said weight and rotatable therewith relative to said other portion.

16. A variable electric condenser comprising a supporting frame, a bank of stationary plates rigidly supported therein, a movable plate assembly cooperating with said stationary bank of plates, means supporting said assembly for rotation about a fixed axis, a counter-balancing member diametrically opposite said movable plate assembly and movable therewith, said member having a static moment about said axis equal and opposite to that of said movable plate assembly, a plurality of click projections arcuately spaced along said member and movable therewith, and a click detent biased into engagement with said click projections.

LEO BEHR.